UNITED STATES PATENT OFFICE.

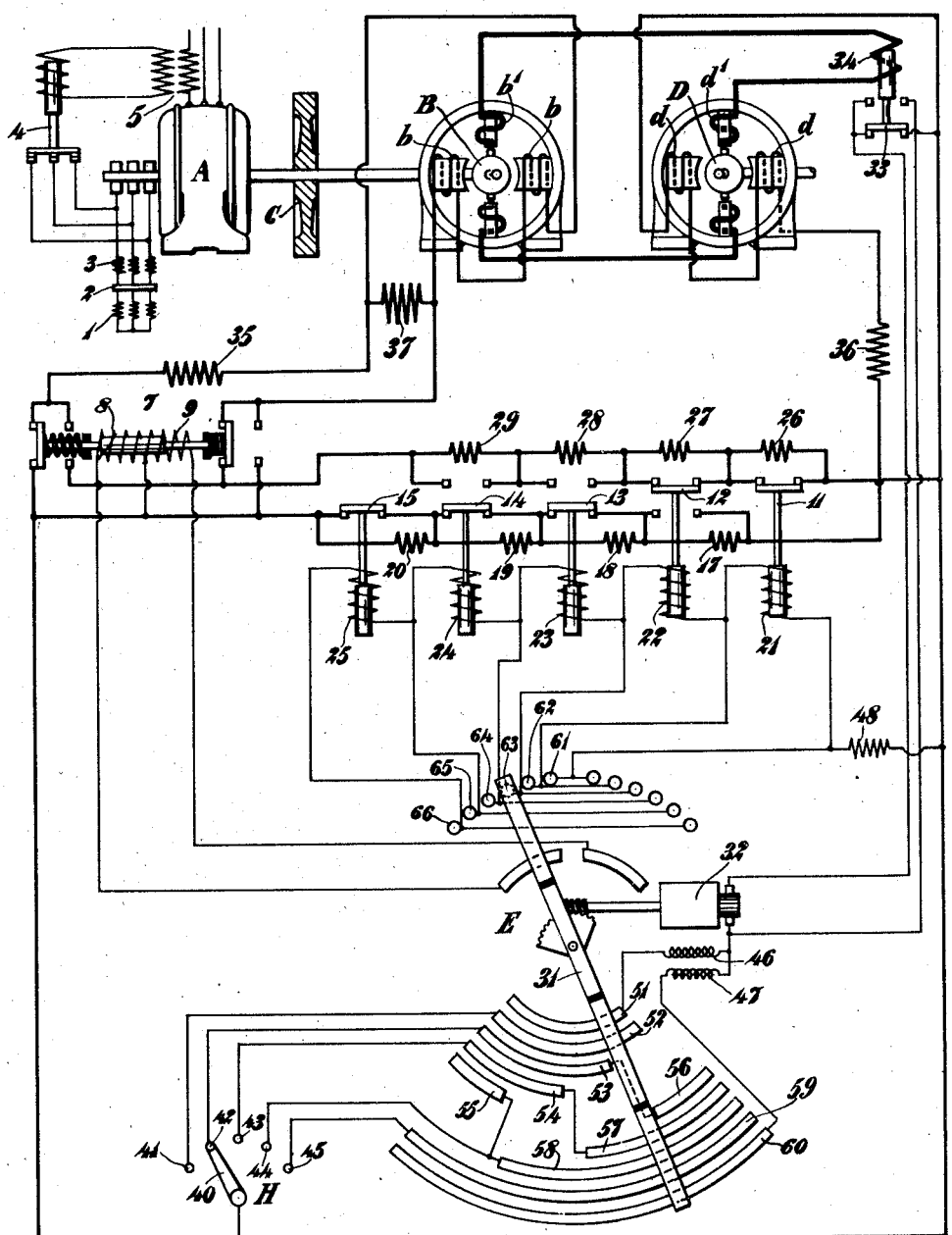

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MOTOR-CONTROL SYSTEM.

988,028.   Specification of Letters Patent.   Patented Mar. 28, 1911.

Application filed May 21, 1907. Serial No. 374,920.

*To all whom it may concern:*

Be it known that I, WILLIAM H. POWELL, citizen of the United States, residing at Norwood, in the county of Hamilton and State of Ohio, have invented certain new and useful Improvements in Motor-Control Systems, of which the following is a full, clear, and exact specification.

My invention relates to motor control systems.

A number of systems have been proposed whereby the moving parts in rolling mills and in hoisting machinery may be electrically driven and economically and accurately controlled. In the most successful of these systems a special generator has been used for supplying the armature of the motor which does the work and this motor has been controlled by varying and reversing the field of the generator and sometimes by varying the field of the motor. The field circuits of both the motor and the special generator have usually been supplied from some auxiliary source of current. But as the size of the units increases, considerable difficulty arises on account of the tendency to spark at the commutators of the machines, especially when operating with large armature currents and weak fields, and also because of the large currents which the manually operated controllers have to control. Besides there has been nothing to prevent a controller from being operated as rapidly as desired, which has allowed dangerously large armature currents both in starting and in stopping. It is also often undesirable that the field circuits of the motor and special generator should extend to the operator's pulpit, often located some distance away.

It is the object of my invention to overcome these difficulties.

My invention therefore broadly comprises the combination of a motor, a generator supplying the armature thereof, and remotely controlled means for controlling the electromotive force of said generator.

Somewhat more specifically my invention comprises the combination of a working motor, a generator supplying the armature of said motor, a second motor for driving said generator and arranged to vary in speed in response to variations in load on said generator, a fly-wheel mechanically connected to said generator, a separate source of electromotive force supplying the field windings of said working motor and said generator, and remotely controlled means for varying the field strengths of said generator and said working motor and for reversing the field of said generator.

In another light my invention comprises the combination of a working motor provided with anti-sparking windings, a generator also supplied with anti-sparking windings and supplying the armature of said motor, and means for varying the field strengths of said generator and said motor.

From another point of view my invention comprises the combination of a generator, a motor the armature of which is supplied by said generator, means for varying the electromotive force of said generator, and means controlled by the armature current of said generator for preventing a too rapid variation in the generator electromotive force.

Other features of my invention will appear from the description and drawings and will be particularly pointed out in the claims.

The single figure of the drawing shows diagrammatically one embodiment of my invention.

In this figure A is an electric motor of the three-phase induction type, though obviously other forms of motors could be used instead. In the rotor circuit of this motor is a starting resistance 1 adjustable by means of a short-circuiting bar 2, and a regulating resistance 3 arranged to be cut in and out by a solenoid switch 4, in turn responsive to the current strength in the primary circuit of the motor, as through a series-transformer 5. Other means for varying the speed of the motor A may be used if desired. A generator armature B is driven by the motor A, being preferably directly connected thereto, and on the common shaft of the motor A and the generator B is a heavy fly-wheel C. The generator B supplies current to the armature D of the working motor, which may be used to drive any desired machinery. Anti-sparking windings $b'$ and $d'$ are provided for the machines B and D. These windings are preferably connected directly in the armature circuit of these machines and may be of any desired type but are here shown as being wound on auxiliary or commutating poles so placed as to assist the commutation.

The field windings b of the generator and d of the working motor are supplied from any suitable direct current source through a switch 6, the same source also preferably supplying the various controlling circuits. In the circuit of the field coils b is a reversing switch 7, which is biased toward its middle or open position but which may be moved to its extreme positions by solenoids 8 and 9 respectively to complete the generator field circuit in the desired direction. A number of switches 11 to 15 are provided, the switches 12 to 15 normally short-circuiting resistance sections 17 to 20 respectively in the circuit of the motor field coils d. These switches may be raised by solenoids 21 to 25 respectively, the switches 11 to 14 when raised short-circuiting resistance sections 26 to 29 respectively in the circuit of the generator field coil b.

An arm 31 of an intermediate controller E, driven by a reversible motor 32, controls the solenoids 8, 9, 21, 22, 23, 24 and 25. The motor 32 is controlled by a master controller H, the position of the arm 31, and a solenoid operated switch 33. The switch 33 normally connects one terminal of the motor 32 to the auxiliary supply circuit, but when the current in the armature circuit of the machines B and D rises to a predetermined value, the solenoid 32 lifts the switch 33 to disconnect the pilot motor from its supply circuit and short-circuit the armature of said motor upon itself to brake it.

A non-inductive resistance 35 is connected in series with the field coils b. This resistance has an ohmic value several times as great as that of the field coil with which it is in series and its purpose is to diminish the time constant of the field magnet b, the time constant of a circuit being a function of its inductance divided by its resistance. Thus, by increasing the resistance of the field circuit without increasing its inductance, the current strength being kept the same, the time constant thereof is reduced. By this means quick reversals of the motor D may be more readily obtained. If desired a similar resistance 36 may be placed in the working motor field circuit in order to reduce its time constant, although the current in this circuit is never reversed but only varied in strength.

In order to take the field discharge of the coils b at the time the circuit through said coils is broken, a high resistance 37 may be permanently connected across said coils. If desired an additional resistance may be provided to assist in taking this field discharge, this resistance being connected across said coils only when the reversing switch 7 is in its middle or open position.

The operation of the system is as follows:—The primary circuit of motor A is closed and the motor started by moving the bar 2 to cut out the resistance 1. The switch 4 is held open by its solenoid at this time because of the heavy current required for starting the motor. If desired, other means may be used to insure the open condition of this switch during starting. After the motor has gained sufficient speed and the starting resistance has been cut out, the solenoid switch 4 is allowed to close to cut out resistance 3 because of the decrease in the primary current of motor A. The fly-wheel C and generator armature B are also started with the motor A, and the fly-wheel stores mechanical energy by its rotation. During this starting the arm 40 of the master controller H and the arm 31 of the intermediate controller E are in their vertical or "off" positions. The switch 6 now being closed, the motor field d is at its strongest, for it has none of the resistance sections 17 to 20 in circuit with it. The generator field b is deënergized because the reversing switch 7 is in its middle or open position. The arm 40 is now moved from the contact 43 to one of the other contacts on either side thereof in the proper direction to give the motor D the desired direction of rotation. Assume that this arm is moved into engagement with contact 41. This closes the circuit through the arm 40, contact 41, contact segment 52, arm 31, contact segment 51, field coil 46 and armature 32 of the pilot motor, and switch 33, and causes said motor to rotate to move the arm 31 in the proper direction, say anti-clockwise. As the arm 31 leaves the vertical, it first engages the contact button 61 to complete the circuit of the solenoid 8 to close the reversing switch 7 in the proper direction, say to the left. This completes the circuit of the field coil b through the resistance sections 26 to 29 and causes said generator to generate a small electromotive force, which, being impressed on the armature D, causes the working motor to start and rotate at a low speed. As the motor 32 continues to move the arm 31 counter-clockwise, said arm engages button 62 and leaves button 61 to connect the solenoid 21 in series with the solenoid 8 to close the switch 11. This short-circuits the resistance section 26 to increase the field strength and therefore the electromotive force of the generator B, thereby increasing the speed of the working motor D. It may also be arranged to cut a section of resistance into circuit with the field winding d to decrease the field strength of the working motor to aid in the increasing of its speed, though preferably the motor field strength is not varied until later. As the arm 31 continues to be moved by the motor 32 it successively connects in circuit the solenoids 22, 23, 24 and 25 to raise the switches 12, 13, 14 and 15, thus gradually increasing the field strength of the generator and decreasing the field strength of the working motor, both of which tend to increase the speed of said motor. When the last switch 15 has been raised the pilot motor 32 will stop because the arm 31 has left the segment 52. There may be any number of the solenoids 21 to 25 and a corresponding number of switches 11 to 15. The individual switches of this group may control resistance sections in both the generator and motor field circuits, as do the switches 12, 13 and 14, or in one only of said circuits, as do the switches 11 and 15, as desired.

As the solenoids 21 to 25 are successively connected in series with the solenoid 8, the resistance of the circuit including said solenoids is gradually increased, thus slightly diminishing the current in said circuit. In order to avoid a too great variation in the current on this account, a resistance 48 is preferably connected in the circuit including the solenoids. The value of this resistance relative to the resistance of the solenoids may be such as to make the variation of current due to the cutting in of the solenoids 21 to 25 as small as desired. If the arm 40 is moved only from button 43 to button 42, however, the motor 32 will not continue to drive the arm 31 to cause the operation of all of the switches 11 to 15 inclusive. Instead, when the arm 31 has reached contact 63, thereby having caused the closing of the switches 11 and 12, it will also have left the contact segment 53, thereby breaking the circuit of the pilot motor 32.

If the load is heavy the working motor requires more power for its starting than the motor A can furnish. The current rising in the primary of transformer 5 by reason of this heavy load, the switch 4 is opened, thus inserting resistance 3 in the rotor circuit of motor A. This increases the slip of motor A and permits said motor to slow down, thus allowing the fly-wheel C to give up some of the mechanical energy it has stored, which energy helps the motor A to drive the generator B to supply electrical energy at the rate demanded by the motor D to drive its load.

When it is desired to slow down or stop the motor D the arm 40 is moved toward or to the contact 43. This causes the motor 32 to move the arm 31 back toward the vertical, allowing some or all of the switches 15, 14, 13, 12, 11 and 7 to return to their normal positions in the order named to increase the field strength of the working motor D, to decrease the electromotive force of the generator B, and finally to interrupt the circuit of the coils b. While this is taking place, the motor D acts temporarily as a generator to supply the armature B, the latter serving as a motor to help restore energy to the fly-wheel C. There is powerful braking effect upon the working motor due to its acting as a generator.

When the load on the generator B diminishes below the value at which the switch 4 opened, either because the motor D has ceased accelerating or because said motor is being slowed down and is running as a generator to drive the machine B as a motor, the diminished current in the primary of the transformer 5 causes the solenoid switch 4 to close. This increases the speed of the motor A so that the latter may supply or help supply energy to the fly-wheel C. The fly-wheel thus stores up any excess of energy supplied when the rate of such supply exceeds the rate at which energy is demanded by the working motor, and gives up said stored energy whenever the rate of energy demanded is greater than the rate of energy supplied.

In case the movement of the arm 31 should be so rapid, either toward or from the vertical, that it causes the current in the armature circuit of the machines B and D to rise beyond a predetermined value, the solenoid 34 lifts the switch 33 to disconnect the motor 32 from the source of supply and short-circuit the armature of said motor upon itself to brake it. This causes the arm 31 to stop wherever it may be until the current in the armature circuit of the working motor has fallen to a safe value, when the switch 33 drops to reconnect the motor 32 to its source of current supply.

When the arm 40 is moved in the other direction from the vertical to engage the contacts 44 or 45, the arm 31 is caused to move similarly in a clockwise direction, energizing the solenoid 9 to close the reversing switch 7 to the right and causing as many of the switches 11 to 15 to be raised as desired. The cycle described above is repeated save that the direction of rotation of the working motor D is reversed.

When it is desired to vary the speed of the motor D from any value in one direction to any value in the other direction the arm 40 is moved from the contact with which it is in engagement, say 42, to a contact on the other side of 43, say 45. This causes arm 31 to move to its extreme clockwise position, so that the switches 12, 11 and 7 are returned to their normal position in the order named, the switch 7 then moved to the right and the switches 11 to 15 raised in the order named. By the arrangement of contact segments 51 to 60 shown, the motor 32 will move the arm 31 to a position corresponding to any circuit closing position of the arm 40, whatever the position of the arm 31 may previously have been. The movement of the arm 31 may be stopped at any point by so moving the arm 40 that it is not in engagement with any of the contacts 41 to 45 inclusive. There may be any number of contacts coöperating with the arm 40, the number of contact segments 51 to 60 suitably corresponding.

As the direction of current in the armatures of the machines B and D reverses, it also reverses in the commutating windings $b'$ and $d'$. Thus the polarity of the commutating poles is correct at all times.

In using the term "inversely" in this description exact inverse proportion is not necessarily intended. Similarly the use of the term "simultaneously" is not intended to mean exact simultaneity of action.

Many modifications may be made in the precise arrangements here shown and described and all such which do not involve a departure from the spirit and scope of my invention I aim to cover in the following claims.

What I claim as new is:—

1. A motor control system comprising a separately excited motor, a separately excited generator exclusively supplying the armature thereof, means for controlling the electro-motive force of said generator, and a manually controlled rotary motor for operating said means.

2. A motor control system comprising a motor, a generator supplying the armature thereof, an auxiliary source of electro-motive force for energizing the fields of said motor and said generator, and a remotely controlled rotary motor operating means for controlling the electro-motive force of said generator.

3. A motor control system comprising a separately excited motor, a separately excited generator supplying the armature thereof, and a remotely controlled rotary motor controlling means for varying the field strengths of said motor and said generator.

4. A motor control system comprising a motor, a generator supplying the armature thereof, an auxiliary source of electro-motive force for energizing the fields of said motor and said generator, means for varying the field strengths of said motor and said generator, and a rotary motor for operating said means.

5. A motor control system comprising a separately excited motor, a separately excited generator exclusively supplying the armature thereof, means for varying and reversing the electro-motive force of said generator, a rotary motor for operating said means, and remote means for controlling said rotary motor.

6. A motor control system comprising a motor, a generator supplying the armature thereof, an auxiliary source of electro-motive force for energizing the fields of said motor and said generator, and a remotely controlling rotary motor operating means for varying and reversing the electro-motive force of said generator.

7. A motor control system comprising a motor, a generator supplying the armature thereof, a rheostat for varying and reversing the field of said generator, and a remotely controlled rotary motor for operating an arm controlling said rheostat.

8. A motor control system comprising a motor, a generator supplying the armature thereof, an auxiliary source of electro-motive force for energizing the fields of said motor and said generator, a rheostat for varying and reversing the field of said generator, and a remotely controlled rotary motor for moving a controlling arm for said rheostat.

9. A motor control system comprising a motor, a generator supplying the armature thereof, a rotary controller for the field strength of said generator, and a manually controlled rotary motor for operating said controller.

10. A motor control system comprising a motor, a generator supplying the armature thereof, a rotary controller for the field strengths of said generator and said motor, and a rotary motor for operating said controller.

11. A motor control system comprising a motor, a generator supplying the armature thereof, a rotary controller for the field strength of said generator, a rotary motor for operating said controller, and means for controlling said motor from a distant point and by the position of said controller.

12. A motor control system comprising a motor, a generator supplying the armature thereof, a rotary controller for the field strengths of said generator and said motor, a rotary motor for operating said controller, and means whereby said rotary motor is controlled from a distant point and by the position of said controller.

13. A motor control system comprising a motor, a generator supplying the armature thereof, a rotary controller for the field strengths of said motor and said generator, a rotary motor for operating said controller, and means for controlling said rotary motor from a distant point and by the position of said controller.

14. A motor control system comprising a motor, a generator supplying the armature thereof, means for controlling the electro-motive force of said generator, a motor for operating said means, and means for controlling said last mentioned motor by the position of the aforesaid means.

15. A motor control system comprising a motor, a generator supplying the armature thereof, means for controlling the electro-motive force of said generator, a motor for operating said means, and means for controlling said last mentioned motor from a distant point and by the position of said first mentioned means.

16. A motor control system comprising a motor, a generator supplying the armature thereof, means for controlling the field strengths of said motor and said generator, a motor for operating said means, and means for controlling said last mentioned motor from a distant point and by the position of said first mentioned means.

17. A motor control system comprising a motor, a generator supplying the armature thereof, means for controlling the value and direction of the electro-motive force of said generator, a motor for operating said means, and means for controlling said last mentioned motor from a distant point and by the position of said first mentioned means.

18. A motor control system comprising a motor, a generator supplying the armature thereof, a controller for the electro-motive force of said generator, a motor for operating said controller, and means for controlling said last mentioned motor from a distant point and by the strength of current in the armature of said generator.

19. A motor control system comprising a motor, a generator for supplying the armature thereof, a controller for the electromotive force of said generator, a motor for operating said controller, and means for controlling said last mentioned motor manually from a remote point and automatically by the position of the controller and the armature current of the generator.

20. A motor control system comprising a motor, a generator supplying the armature thereof, a controller for the electro-motive force of said generator, a motor for operating said controller, and means for controlling the said last mentioned motor by the position of the controller and by the armature current of the generator.

21. A system of motor control comprising a motor, a generator supplying the armature thereof, a set of magnetically operated switches for varying and reversing the field strength of said generator, a movable arm for controlling said switches, and a remotely controlled motor for moving said arm.

22. A system of motor control comprising a motor, a generator supplying the armature thereof, a set of magnetically operated switches for controlling the field strength of said generator, a movable arm for controlling said switches, a motor for moving said arm, and means for controlling said last mentioned motor from a distant point and by the position of said arm.

23. A system of motor control comprising a motor, a generator supplying the armature thereof, a set of magnetically operated switches for controlling the field strength of said generator, a movable arm for controlling said switches, a motor for moving said arm, and means for controlling said last mentioned motor by the position of said arm and by the armature current of said generator.

24. A system of motor control comprising a motor, a generator supplying the armature thereof, a set of magnetically operated switches for controlling the field strength of said generator, a movable arm for controlling said switches, a motor for moving said arm, and means for controlling said last mentioned motor from a remote point and by the armature current of said generator.

25. A system of motor control comprising a motor, a generator supplying the armature thereof, a set of magnetically operated switches for controlling the field strength of said generator, a movable arm for controlling said switches, a motor for moving said arm, and means for controlling said last mentioned motor from a remote point, by the position of said arm, and by the armature current of said generator.

26. A motor control system comprising a motor, a generator supplying the armature thereof, a main controller for varying the field strength of said generator, a master controller for the main controller, and means for stopping the progression of said main controller in response to movements of the master controller when the current supplied by said generator exceeds a predetermined value.

27. In combination, two dynamo-electric machines, a main controller for varying the relative field strengths of said machines to cause them alternately to act as generator to supply the armature of the other machine, a master controller for the main controller and means for stopping the progression of said main controller in response to movements of the master controller when the armature current of said machines exceeds a predetermined value.

28. A motor control system comprising a motor, a generator supplying the armature of said motor, a main controller for varying the field strengths of said generator and said motor, a master controller for the main controller, and means for stopping the movement of said main controller in response to movements of the master controller when the current in the armatures of said machines exceeds a predetermined value.

29. A motor control system comprising a motor, a generator supplying the armature of said motor, remotely controlled power-operated means for varying the electromotive force of said generator, and means acting on said power-operated means for preventing it from causing a too rapid decrease in said electromotive force.

30. In combination, a motor, a master controller having different positions for different motor speeds, a main controller for the motor arranged to follow the movements of the master controller, and means for preventing the main controller from following the movements of the master controller to cause a too rapid slowing down of the motor.

31. A motor control system. comprising a motor, a generator supplying the armature of said motor, a master controller, a main controller for varying the electromotive force of said generator and arranged to follow the movements of the master controller, and means for stopping the progression of the main controller in case of a too rapid decrease in the speed of said motor.

32. In combination, a motor, a master controller having different positions for different motor speeds, a main controller for varying the electro-motive force impressed on the motor armature and arranged to follow the movements of the master controller, and means for stopping the progression of the main controller in either direction in case the current in the motor armature rises above a predetermined value.

33. In combination, a motor, a master controller having different positions for different motor speeds, a main controller for the motor arranged to follow the movements of the master controller, and means for stopping the progression of the main controller in the speed-decreasing direction in case the current in the motor armature exceeds a predetermined value.

34. In combination, a generator having a separately excited field circuit, a field resistance, switches for connecting said field circuit to a source of current for either direction of current flow and for regulating the amount of said resistance in said circuit, a master-switch for controlling the operation of said switches, a motor connected to said generator, and means responsive to the current in the motor circuit for so regulating the rate at which said switches respond to movements of said master-switch that during acceleration, reversal and deceleration of said motor the current in the motor circuit can not exceed a certain value.

35. In combination, a generator having a separately excited field circuit, a field resistance, electrically controlled switches for connecting said field circuit to a source of current through said resistance for either direction of current flow and for regulating the amount of said resistance in the field circuit, a master-switch for controlling the operation of said switches, a motor connected to said generator, and means responsive to the current in the motor circuit for regulating the rate at which said switches cut out said resistance when the master-switch is thrown to an "on" position and the rate at which said switches reinsert said resistance when the master-switch is thrown to the "off" position.

36. In combination, a generator having a separately excited field circuit, a field resistance, electrically controlled switches for connecting said field circuit to a source through said resistance for either direction of current flow and for regulating the amount of said resistance in the field circuit, a master-switch for controlling the operation of said switches, a motor connected to said generator, and means responsive to the current in the motor circuit for regulating the rate at which said switches respond to a movement of the master-switch from any position to another.

37. In combination, a generator having a separately excited field circuit, a field resistance, switches for regulating the amount of said resistance in said circuit, a master switch for controlling the operation of said switches, a motor connected to said generator, and means responsive to the current in the motor circuit for regulating the rate at which said switches respond to movements of said master switch.

38. In combination, a generator having a separately excited field circuit, a field resistance, electrically controlled switches for regulating the amount of said resistance in the field circuit, a master-switch for controlling the operation of said switches, a motor connected to said generator, and means responsive to the current in the motor circuit for regulating the rate at which said switches cut out said resistance when the master-switch is moved to increase the motor speed and the rate at which said switches reinsert said resistance when the master switch is moved to decrease the motor speed.

39. In combination, a generator having a separately excited field circuit, a field resistance, electrically controlled switches for regulating the amount of said resistance in the field circuit, a master switch for controlling the operation of said switches, a motor connected to said generator, and means responsive to the current in the motor circuit for regulating the rate at which said switches respond to a movement of the master switch from any position to another.

40. In combination, a generator, a motor supplied thereby, a power-operated controller for controlling the electromotive force of said generator, a master controller for controlling the operation of said power-operated controller, and means responsive to the current in the motor circuit for controlling the rate at which the power-operated controller responds to movements of the master controller.

41. In combination, a generator, a motor supplied thereby, a plurality of power-operated switches for controlling the electromotive force of said generator, a master controller for controlling the operation of said power-operated switches, and means responsive to the current in the motor circuit for regulating the rate at which said switches respond to movements of the master controller.

42. In combination, a generator, a motor, the armatures of the generator and motor being connected in series and the generator having a separately excited field, a power-operated controller for controlling the field strength of the generator, a master controller for controlling the operation of said power-operated controller, and means responsive to the current in the circuit including the armatures of the generator and the motor for controlling the rate at which said power-operated controller responds to movements of the master controller.

43. In combination, a motor, a generator, the armatures of the generator and the motor being connected in a series circuit and the generator having a separately excited field, a plurality of power-operated switches for controlling the field strength of said generator, a master-controller for controlling the operation of said switches, and means responsive to the current in the circuit including the armatures of the generator and the motor for regulating the rate at which said switches respond to movements of the master controller.

44. In combination, a generator, a motor supplied thereby, an electrically operated controller for varying the electromotive force of said generator, a master switch for controlling the operation of said electrically operated controller, and means responsive to the current in the armature circuit of said motor for regulating the rate at which said electrically operated controller is operated in response to movements of the master switch.

45. In combination, a generator, a motor connected thereto, a plurality of electrically operated switches for controlling the electromotive force of said generator, a master switch for controlling the operation of said switches, and means responsive to the current in the armature circuit of the motor for regulating the rate at which the electrically operated switches respond to movements of the master switch.

46. In combination, a generator, a motor connected thereto, a power-operated controller for controlling the electromotive force of said generator, a master controller for controlling the operation of said power-operated controller, and means responsive to the current in the armature of said motor for stopping the progression of the power operated controller in response to movements of the master controller when the current in said circuit reaches a predetermined value.

47. In combination, a generator, a motor connected thereto, a plurality of power-operated switches for controlling the electromotive force of said generator, a master controller for controlling the operation of said switches, and means responsive to the current in the armature circuit of said motor for stopping the progression of said switches in response to movements of the master controller when the current in said circuit exceeds a predetermined value.

In testimony whereof I affix my signature, in the presence of two witnesses.

WILLIAM H. POWELL.

Witnesses:
   GEO. B. SCHLEY,
   FRED J. KINSEY.